United States Patent [19]

Kitrell

[11] 4,437,676

[45] Mar. 20, 1984

[54] MOBILE TRAVEL TRUNK

[76] Inventor: John V. Kitrell, 4639 Holdrege, Lincoln, Nebr. 68503

[21] Appl. No.: 422,003

[22] Filed: Sep. 23, 1982

[51] Int. Cl.$^3$ .............................................. B62D 61/00
[52] U.S. Cl. ........................................ 280/78; 49/256; 220/326; 220/344; 292/247
[58] Field of Search ........................ 220/326, 335, 344; 49/255, 256, 278; 105/281, 284, 285, 308 E; 180/69 R; 292/247, DIG. 72; 280/204, 78, 402, 460 R

[56] References Cited

U.S. PATENT DOCUMENTS

| | | | |
|---|---|---|---|
| 2,372,369 | 3/1945 | Ditchfield | 49/278 X |
| 2,470,978 | 5/1949 | Du Brie | 280/78 X |
| 2,691,546 | 10/1954 | Torrance | 280/460 X |
| 3,524,659 | 8/1970 | Filter | 280/482 X |

FOREIGN PATENT DOCUMENTS 1117400  11/1961  Fed. Rep. of Germany ........ 280/78

*Primary Examiner*—Joseph F. Peters, Jr.
*Assistant Examiner*—Michael Mar
*Attorney, Agent, or Firm*—Zarley, McKee, Thomte, Voorhees & Sease

[57] ABSTRACT

A mobile travel trunk is described including a water tight trunk or trailer compartment including a load adjustable suspension system. The forward end of the travel trunk includes a hitch assembly which is adapted to be secured to the bumper of a vehicle or the like. The rearward end of the trunk has a trapezoidal shaped opening which is defined by a U-shaped lip extending around three sides thereof. A spring loaded trapezoidal shaped door is pivotally mounted to the lower end of the rear wall of the trunk and includes a U-shaped lip which is adapted to be received by the U-shaped lip extending around the opening. When the door is in its closed position, a compression latch assembly causes the door to compress a resilient seal member extending around the door opening to provide a water tight and dust proof seal. The suspension system may be easily removed from the travel trunk to enable the travel trunk and the suspension system to be separately stored.

8 Claims, 7 Drawing Figures

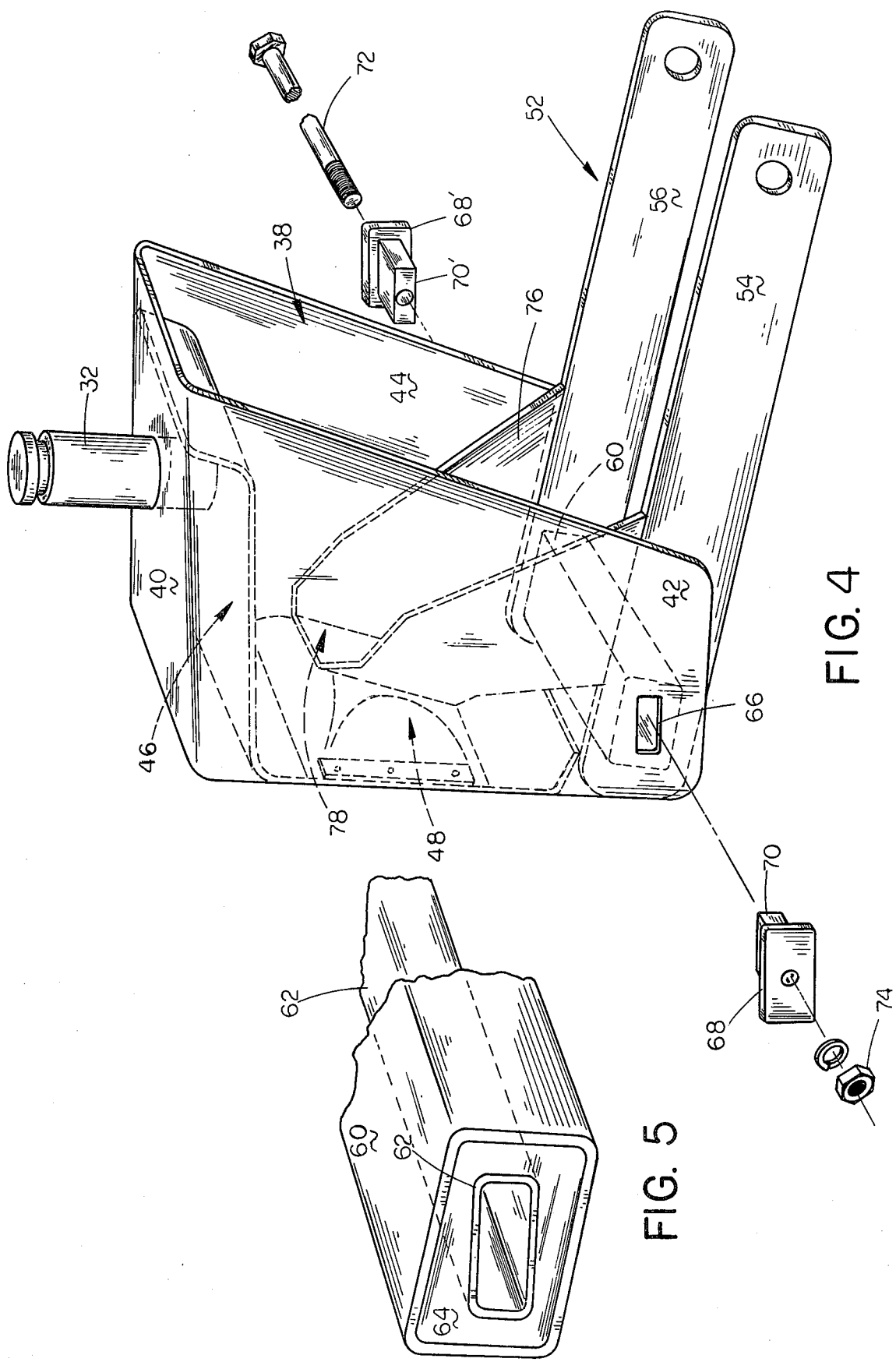

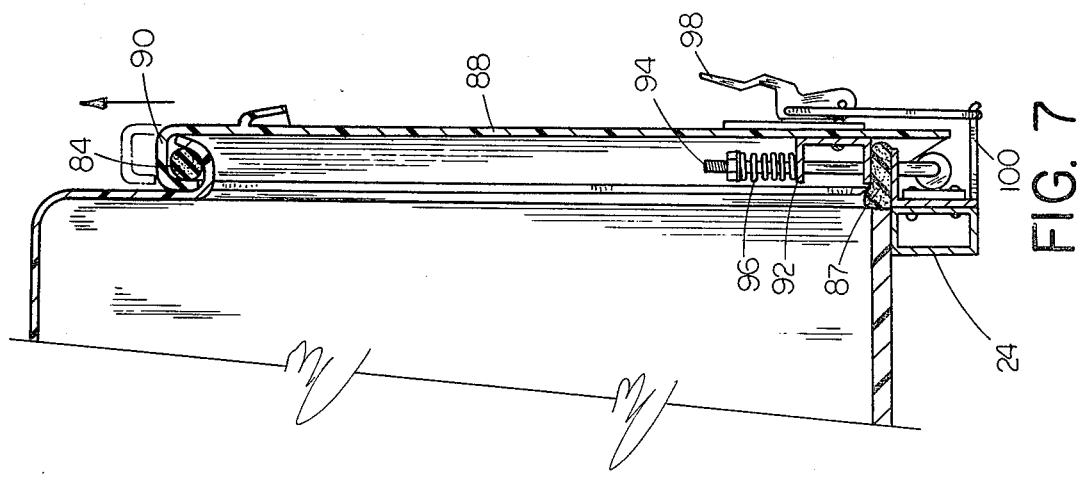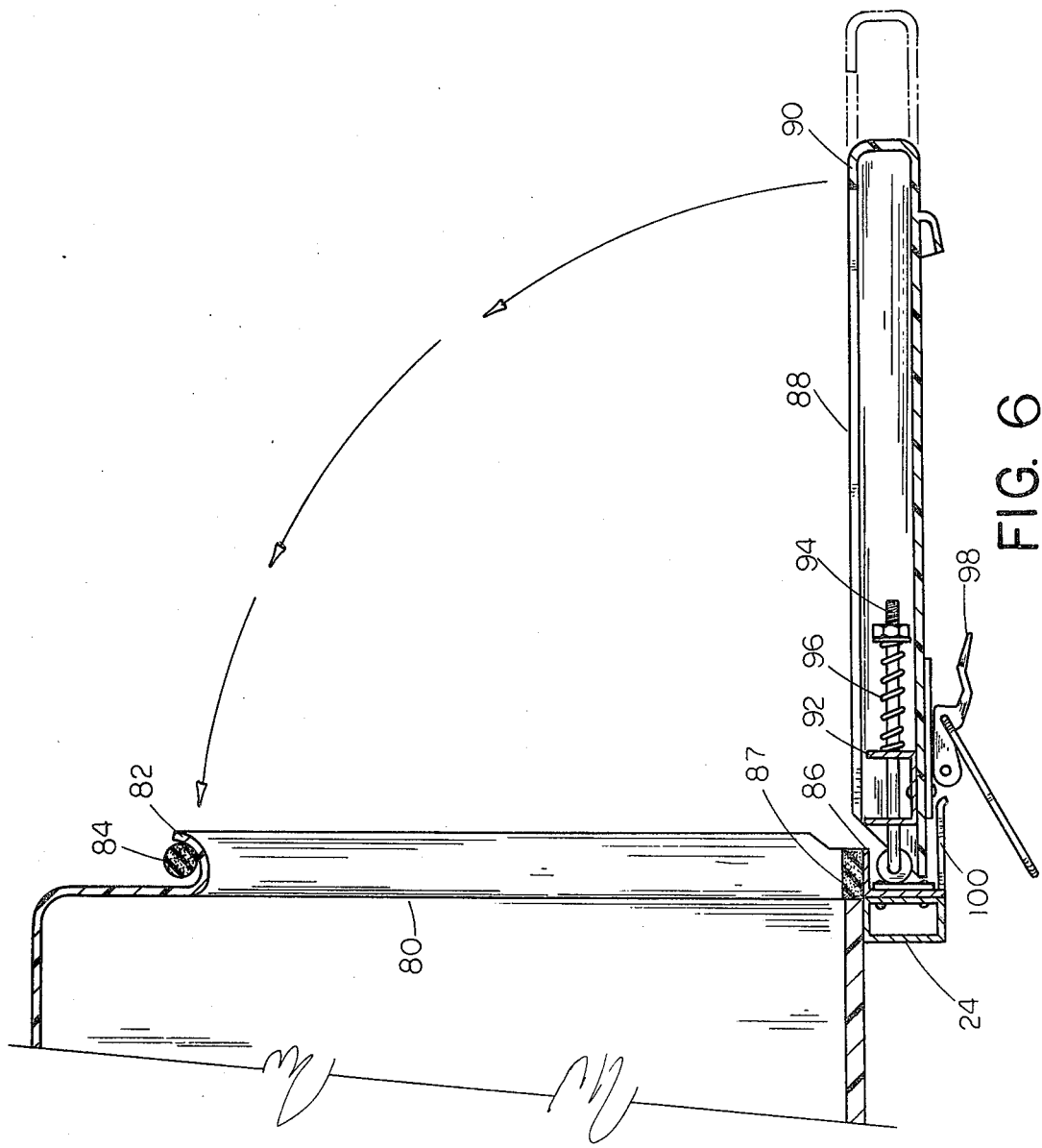

MOBILE TRAVEL TRUNK

BACKGROUND OF THE INVENTION

Many types of small trailers have been previously provided with the most common type of small trailer being a single wheel trailer connected to the bumper of a automobile or the like. A problem associated with the conventional travel trailers is that water and dust sometimes enter the interior of the trailer. A further problem associated with conventional travel trailers is that they occupy a great deal of space when not being used and are therefore difficult to store. A still further problem associated with the conventional travel trailers is the inadequate suspension systems normally associated therewith.

Therefore, it is a principal object of the invention to provide a mobile travel trunk including a novel suspension system.

A still further object of the invention is to provide a mobile travel trunk including means for preventing the entry of wate or dust into the interior thereof.

A still further object of the invention is to provide a mobile travel trunk wherein the suspension system is easily removable from the trunk to enable the trunk to be conveniently stored.

A still further object of the invention is to provide a mobile travel trunk which is economical of manufacture, durable in use and refined in appearance.

These and other objects will be apparent to those skilled in the art.

BRIEF DESCRIPTION OF THE DRAWINGS

FIG. 4 is a perspective view of the suspension system.

FIG. 5 is a partial perspective view of a portion of the suspension system:

FIG. 6 is a partial sectional view of the rearward end of the trunk; and

FIG. 7 is a view similar to FIG. 6 except that the door has been moved to its closed position.

SUMMARY OF THE INVENTION

A mobile travel trunk is described including a fiberglass trunk having a trapezoidal shaped door opening at its rearward end which is closed by a trapezoidal shaped door pivotally mounted to the rear end of the trunk. The door is spring loaded to enable the door to compress a seal positioned around the door opening when the door is closed to prevent the entry of water and dust into the interior of the trunk. A quickly removable suspension system is secured to the trunk and includes primary and secondary load supporting means.

DESCRIPTION OF THE PREFERRED EMBODIMENT

Figure 1:
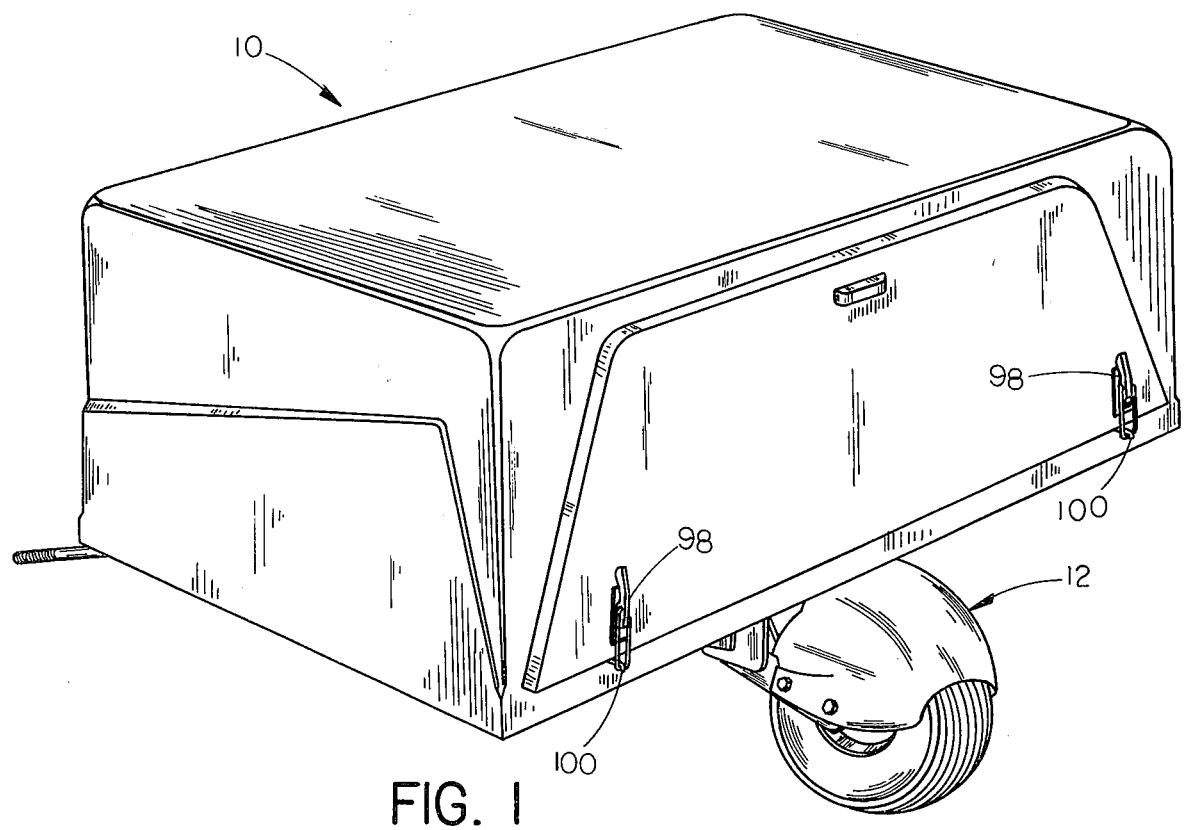
FIG. 1 is a rear perspective view of the mobile travel trunk.

In FIG. 1, the numeral 10 refers generally to a trailer or the like having the suspension system 12 mounted thereon. Trailer 10 includes a frame means 14 having a travel trunk 16 secured thereto by any convenient means.

Figure 2:
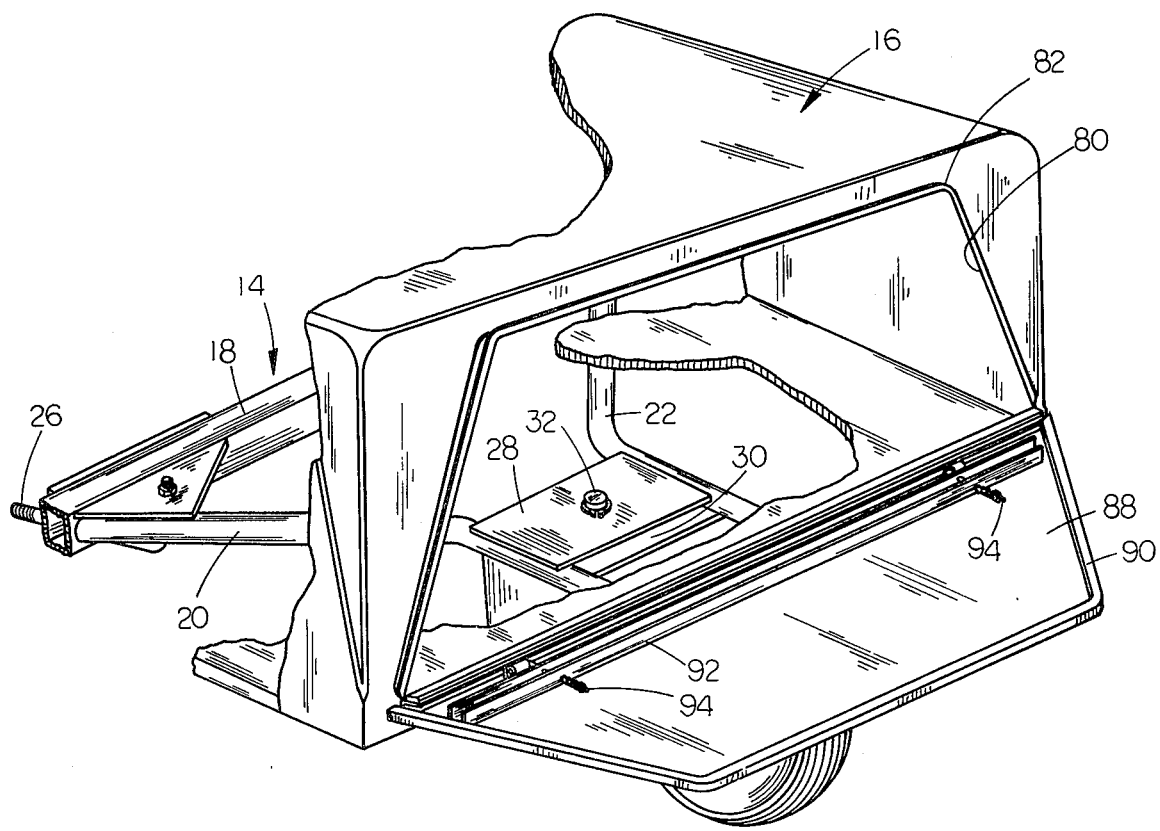
FIG. 2 is a view similar to FIG. 1 except that a portion of the trunk has been cut away to more fully illustrate the invention.

Frame means 14 comprises a transversely extending front frame member 18 having a pair of frame members 20 and 22 secured to the opposite ends thereof by welding or the like which extend rearwardly and inwardly as illustrated in FIG. 2 and then which extend rearwardly in a parallel fashion. A rear frame member 24 is secured to the rearward ends of frame members 20 and 22 and extends transversely outwardly therefrom. A pair of adjustable attachment members 26 are secured to frame member 18 and extend forwardly therefrom for connection to the hitch of the vehicle pulling the trailer.

Figure 3:
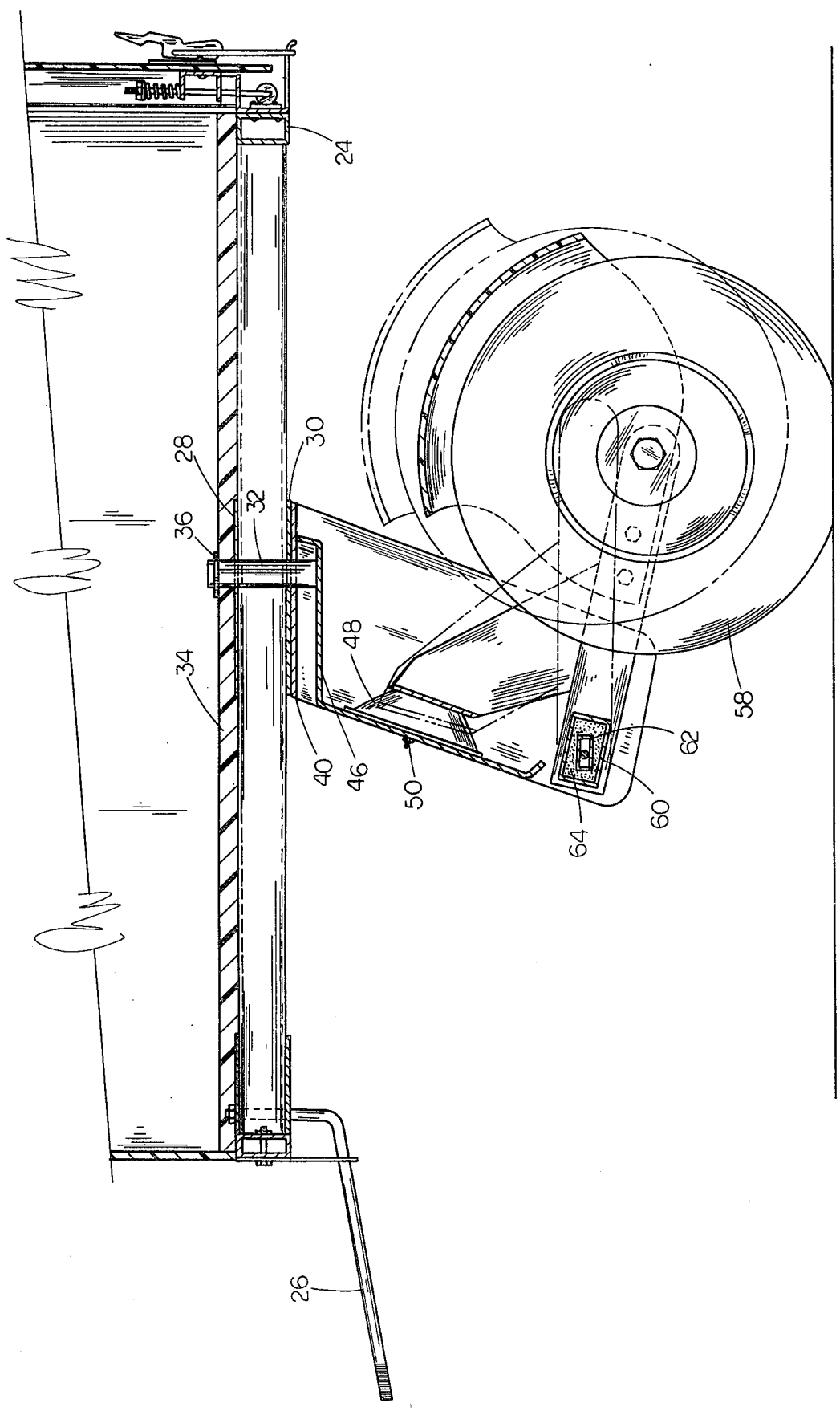
FIG. 3 is a partial longitudinal sectional view of the mobile travel trunk.

A pair of plates 28 and 30 are welded to the frame members 20 and 22 as seen in FIG. 2. Plates 28 and 30 are provided with registering openings formed therein to enable the pivot stem 32 to be extended upwardly therethrough. As seen in FIGS. 2 and 3, trunk 16 includes a floor member 34 through which the pivot stem 32 extends. Pivot stem 32 is secured to the travel trunk 16 or to the plates 28 and 30 by any convenient means such as a snap ring 36 or the like.

Secured to the stem 32 at a point above the lower end thereof is an inverted U-shaped frame means 38 comprising a top portion 40 having a pair of spaced-apart side walls 42 and 44 extending downwardly from the opposite sides thereof. An inner plate 46 is secured to the lower end of pivot stem 32 and is secured to and bridges the space between the side walls 42 and 44 of frame means 38. An inflatable load leveler air bag or cushion 48 is secured to the inner plate 46 by any convenient means and has a valve stem 50 in communication therewith which enables the pressure of the air bag 48 to be selectively varied. Preferably, air bag 48 is constructed of a fabric and rubber vulcanized material.

A wheel yoke 52 is received between the lower ends of the side walls 42 and 44 and comprises wheel yoke members 54 and 56. Wheel 58 is secured to the rearward ends of the wheel yoke members 54 and 56 in conventional fashion. A wheel yoke pivot cross member 60 in the form of an elongated hollow tubular member is welded to the forward ends of yoke members 54 and 56 and extends therebetween. An elongated axial member 62 in the form of an elongated hollow tubular member is positioned within the tubular member 60 and is unequally oriented as illustrated in the drawings. The space between the inside wall surfaces of tubular member 60 and the outside wall surfaces of tubular member 62 is filled with a resilient and compressible material such as urethane or the like referred to generally by the reference numeral 64. As seen in the drawings, the lower ends of side walls 42 and 44 are provided with an opening 66 which registers with the ends of the tubular member 62. Pivot snubber anchor blocks 68 and 68' are positioned outwardly of walls 42 and 44. Snubber blocks 68 and 68' have block portions 70 and 70' thereon respectively which extend through the openings 66 and which are received by the ends of tubular member 62. An elongated bolt 72 extends through the snubber anchor block 68', tubular member 62 and anchor block 68 to maintain the assembly together. Bolt 72 is maintained in position by nut 74.

A wheel yoke load plate 76 is welded to the upper forward ends of the yoke members 52 and 54 and extend upwardly therefrom as illustrated in the drawings. Wheel yoke load plate 76 includes a forwardly presented load leveler engagement surface or wall 78 which engages the air bag 48 as seen in the drawings.

As seen in the drawings, travel trunk 16 has a hollow interior and is provided with a trapezoidal shaped opening 80 formed in the rearward wall thereof. A U-shaped lip 82 extends around the sides and upper portion of the opening 80 and has a seal means 84 positioned therein. As seen in FIG. 6, an angular threshold member 86 is secured to frame member 24 at the lower end of the opening 80. Threshold seal 87 is positioned on the upper surface of the threshold 86.

The numeral 88 refers to a trapezoidal shaped door which is provided with a U-shaped lip 90 at its upper edge and at its opposite sides which are adapted to be received by the U-shaped lip 82 as will be described in more detail hereinafter. A U-shaped channel member 92 is secured to door 88 adjacent its lower end and extends thereacross as illustrated in FIG. 2. A pair of spaced-apart hinge pins 94 extend through openings formed in the channel 92 and have springs 96 positioned thereon as best illustrated in FIG. 6. Hinge pins 94 are rotatably or hingedly secured to the frame member 24 by any convenient means to provide the pivotal connection between the door 88 and the travel trunk. A pair of spaced-apart compression latch assemblies 98 are secured to the lower exterior surface of the door 88 and are adapted to be secured to the latch plates 100 extending rearwardly from the lower end of frame member 24 as seen in FIG. 6.

The door 88 may be moved from the open position of FIG. 2 to the closed position of FIG. 1 as follows. When it is desired to close the door 88, the door 88 is pivotally moved in the direction of the arrows as illustrated in FIG. 6. When U-shaped lip 90 is closely positioned to the U-shaped lip 82, upward force is applied to the door so that the lip 90 may be received by the lip 82 and which is permitted by the springs 96. When the lip 90 has been positioned in the lip 82, the seal 84 is compressed as illustrated in FIG. 7 to provide a positive seal around the opening. As also seen in FIG. 7, channel 92 compresses the threshold seal 87 to seal the lower end of the opening 80.

The suspension system attached to the travel trunk is believed to be unique for several reasons. When it is desired to store the trunk, snap ring 36 may be removed so that the suspension system may be stored separately from the travel trunk thereby permitting the trunk to be more conveniently stored. A second advantage in the suspension system is that the air pressure in load leveler air bag 48 may be varied to compensate for different load weights. The shock absorber system is also thought to be unique in that upward movement of the wheel 58 with respect to the travel trunk causes the material 64 to be compressed which acts as an efficient and economical shock absorber. After the wheel 58 has passed over the bump or the like which caused the compression of the material 64, the material 64 tends to return the wheel to its original position.

Thus it can be seen that the mobile travel trunk of this invention accomplishes at least all of its stated objectives.

I claim:
1. A mobile travel trunk, comprising,
a trunk means having rearward and forward ends, a top, a bottom and opposite side walls which define a compartment area,
means on the forward end of said trunk means for securing said trunk means to a vehicle,
a wheeled-suspension means operatively secured to said bottom of said trunk means,
said rearward end of said trunk means having a trapezoidal shaped opening formed therein defined by upper and lower edges and a pair of side edges,
said rearward end of said trunk means having a U-shaped lip at said upper edge and said side edges of said opening,
a trapezoidal shaped door pivotally mounted at the rearward end of said trunk means along the lower edge of said opening and being movable between open and closed positions,
said door having upper and lower edges and a pair of side edges,
said door having a U-shaped lip at its upper edge and at its side edges which are adapted to be received by said U-shaped lip at the upper and side edges of said opening when said door is in its closed position,
hinge means pivotally securing said door to said trunk means,
said hinge means including a spring assembly whereby said door may be moved generally radially outwardly and upwardly with respect to said trunk means against the urging of said spring assembly to permit said U-shaped lip on said door to clear said U-shaped lip on the rearward end of said trunk means during opening and closing operations of said door, said spring assembly urging said door downwardly in the closed position thereof, and
a latch assembly having a latch member mounted adjacent the lower edge of said door and releasably engaging a latch plate connected to said bottom wall for preventing upward movement of said door in the closed position.

2. The travel trunk of claim 1 wherein a first seal means is positioned in said U-shaped lip on the rearward end of said trunk means.

3. The travel trunk of claim 2 wherein a horizontally disposed seal means is positioned rearwardly of the lower edge of said opening and wherein said latch assembly is operatively connected to said door for compressing said first seal means and said horizontally disposed seal means, when said door is in its closed position, to seal said opening.

4. The travel trunk of claim 1 wherein said wheeled-suspension means is removably mounted on said trunk means.

5. The travel trunk of claim 1 wherein said wheeled-suspension means comprises a frame means mounted on the bottom of said trunk means, a pivot stem secured to said frame means and extending downwardly therefrom, an inverted U-shaped frame member comprising a top portion secured to the lower end of said pivot stem and a pair of spaced apart side walls extending downwardly from opposite ends of said top portion, a wheel yoke having rearward and forward ends, a wheel rotatably mounted at the rearward end of said wheel yoke, a first hollow tubular member secured to the forward end of said wheel yoke, a second hollow tubular member positioned within said first hollow tubular member and having its outside diameter spaced from the inside diameter of said first tubular member to create a space therebetween, a compressible material in said space, and means connecting the opposite ends of said second tubular member to the side walls of said frame member whereby vertical movement of said wheel and wheel yoke will compress said compressible material.

6. The travel trunk of claim 5 wherein a wheel yoke load plate is secured to the forward end of said wheel yoke and extends upwardly therefrom for engagement with an inflatable load leveler mounted on said frame member.

7. The travel trunk of claim 6 wherein said pivot stem is removably secured to said frame means.

8. A mobile travel trunk, comprising,
- a trunk means having rearward and forward ends, a top, a bottom and opposite side walls which define a compartment area,
- said rearward end of said trunk means having a trapezoidal shaped opening formed therein defined by upper and lower edges and a pair of side edges,
- said rearward end of said trunk means having a U-shaped lip at said upper edge and said side edges of said opening,
- a trapezoidal shaped door pivotally mounted at the rearward end of said trunk means along the lower edge of said opening and being movable between open and closed positions,
- said door having upper and lower edges and a pair of side edges,
- said door having a U-shaped lip at its upper edge and at its side edges which are adapted to be received by said U-shaped lip at the upper and side edges of said opening when said door is in its closed position,
- hinge means pivotally securing said door to said trunk means,
- said hinge means including a spring assembly whereby said door may be moved generally radially outwardly and upwardly with respect to said trunk means against the urging of said spring assembly to permit said U-shaped lip on said door to clear said U-shaped lip on the rearward end of said trunk means during opening and closing operations of said door, said spring assembly urging said door downwardly in the closed position thereof, and
- a latch assembly having a latch member mounted adjacent the lower edge of said door and releasably engaging a latch plate connected to said bottom wall for preventing upward movement of said door in the closed position.

* * * * *